US008284416B2

(12) United States Patent
Suh et al.

(10) Patent No.: US 8,284,416 B2
(45) Date of Patent: Oct. 9, 2012

(54) DIGITAL IMAGE PRINTING A JOB INCLUDING MONOCHROMATIC AND COLOR IMAGES

(75) Inventors: Eun Suk Suh, Rochester, NY (US); Henry T. Bober, Fairport, NY (US); William A. Blitz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 769 days.

(21) Appl. No.: 12/430,271

(22) Filed: Apr. 27, 2009

(65) Prior Publication Data

US 2010/0271649 A1 Oct. 28, 2010

(51) Int. Cl.
*G06F 3/12* (2006.01)

(52) U.S. Cl. ..................... 358/1.13; 358/1.14; 358/1.15; 399/110; 399/107; 399/122

(58) Field of Classification Search ................. 358/1.13, 358/1.14, 1.15; 399/110, 107, 122
See application file for complete search history.

(56) References Cited

U.S. PATENT DOCUMENTS

| | | | | |
|---|---|---|---|---|
| 5,650,049 | A * | 7/1997 | Kivimaa et al. | 162/360.2 |
| 7,206,536 | B2 * | 4/2007 | Julien | 399/110 |
| 7,305,198 | B2 * | 12/2007 | Julien | 399/69 |
| 2006/0067757 | A1 * | 3/2006 | Anderson et al. | 399/341 |
| 2006/0176336 | A1 * | 8/2006 | Moore et al. | 347/41 |
| 2010/0247194 | A1 * | 9/2010 | Suh | 399/367 |

* cited by examiner

*Primary Examiner* — Jacky X Zheng
(74) *Attorney, Agent, or Firm* — Fay Sharpe LLP

(57) ABSTRACT

Separate multicolorant and monochromatic digital image marking engines are operated concurrently for print jobs having both monochromatic and color images. The marked multicolorant image sheets are batch printed and held in a sheet buffer and interspersed in sequence with the monochromatic marked sheets without interrupting the faster monochromatic marking engine or requiring multiple unnecessary run cost increasing start up and shut down cycles of the multicolorant marking engine.

10 Claims, 6 Drawing Sheets

DIGITAL IMAGE PRINTING A JOB INCLUDING MONOCHROMATIC AND COLOR IMAGES

BACKGROUND

The present disclosure relates to printing from digitally imaged documents including monochromatic text and images and multicolorant text and images and particularly relates to such printing jobs where the majority or bulk of the images are monochromatic with some color images included or interspersed therein. Where print jobs of this nature are to be executed on cut sheet print media, it is generally advantaged to have separate digital image printing engines for printing the multicolorant images and the monochromatic images. Typically, multicolorant digital printing or marking engines are by their very nature slower in production rate than monochromatic digital image marking engines. This presents a problem where a print job requires a low per document cost and/or high rate of production, for example where multiple copies of a document are required that includes some multicolorant images, inasmuch as the production rate is slowed to accommodate the sequencing of the pages having the multicolorant images with the monochromatic image pages.

Furthermore, where both monochromatic and multicolorant digital image marking engines are required for full service printing jobs, it has been desired to not only increase the production rate but to minimize the volume or size of the equipment required and particularly the floor space occupied by the equipment. Typically, the equipment required for digital image printing with a multicolorant and monochromatic marking engine utilizes a sheet stock feeder which feeds sheets to one of the marking engines directly and bypasses the one marking engine for feeding sheets to the other marking engine and requires delays in the transport of the monochromatic sheets in order to properly sequence the pages of the document for those having color images. In addition, the processing time for cut sheet print jobs including color and monochromatic images is delayed as a result of the time required for cycling up and cycling down of the slower multicolorant marking engines. Thus, it has been desired to provide a way or means of increasing the production rate of print jobs having both monochromatic and color image pages and to minimize the size of the floor space requirement of the equipment required for processing such print jobs with cut sheet stock print media.

BRIEF DESCRIPTION

The present disclosure describes an arrangement of separate multicolorant and monochromatic digital image marking engines for printing jobs including both color and monochromatic images at optimized production speed, minimized per document cost and with equipment requiring a minimum of floor space. In one version the multicolorant and monochromatic marking engines are stacked vertically with a storage buffer adjacent the multicolorant image marking engine; and, in another version the storage buffer is disposed about the monochromatic marking engine in sections. The storage buffer is operative to hold batch printed marked sheets from the multicolorant image marking engine and to intersperse them in the proper sequence with the monochromatic image sheets being transported to the finisher. This arrangement enables the multicolorant marking engine to concurrently with the monochromatic marking engine print all the pages of the print job having color images thereon in a single batch rather than requiring multiple cycle up and cycle down cycles to individually print he several multicolorant pages in sequence exactly when they are required. In addition, the arrangement of the storage buffer in sections about the monochromatic marking engine in vertically stacked arrangement with the multicolorant marking engine minimizes the volume of the equipment and eliminates the need for additional floor space for the equipment.

DETAILED DESCRIPTION

Figure 1:
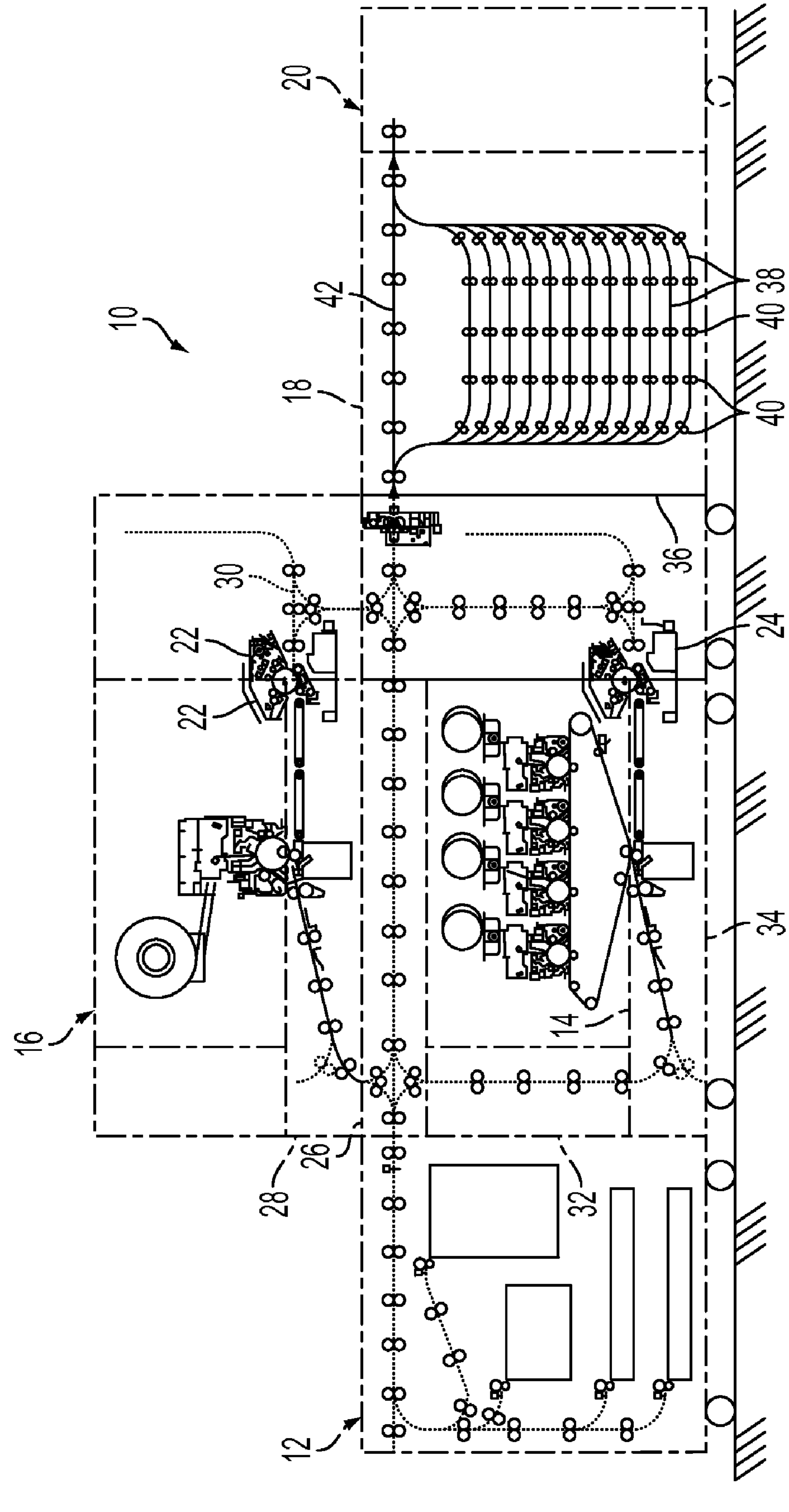
FIG. 1 is a cross-section of one version of a digital image printing arrangement having a monochromatic image marking engine disposed directly vertically above a multicolorant marking engine with a storage buffer adjacent the multicolorant marking engine.
Figure 2:
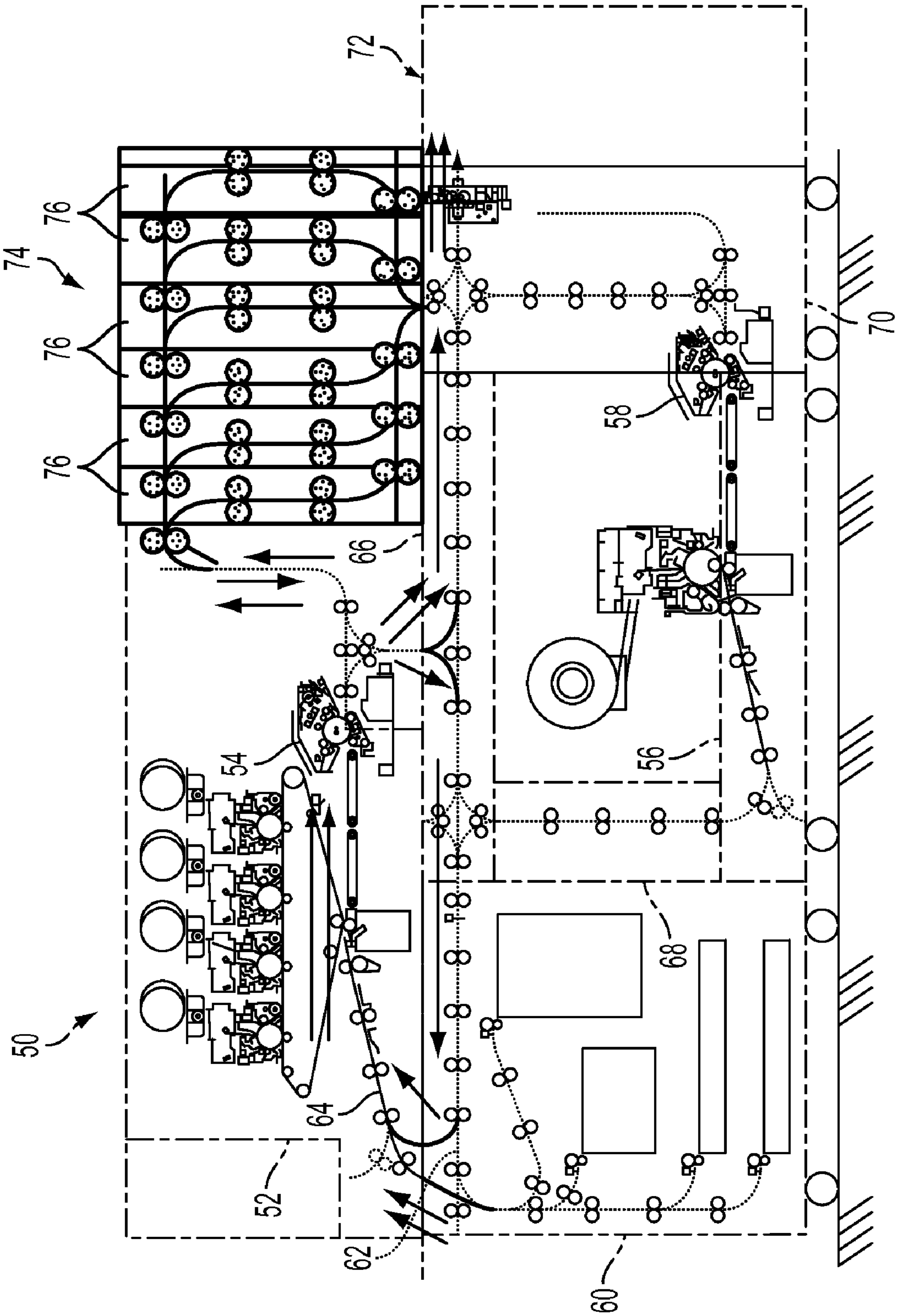
FIG. 2 is a view similar to FIG. 1 of another version of a digital image printing equipment arrangement having a multicolorant marking engine disposed above a sheet feeder and monochromatic marking engine with a multisection storage buffer disposed adjacent the multicolorant marking engine.

Referring to FIG. 1, a digital image printing arrangement for printing jobs with multicolorant and monochromatic images is indicated generally at 10 and includes a sheet stock feeder indicated generally at 12, a multicolorant marking engine indicated generally at 14, a monochromatic marking engine indicated generally at 16 disposed above the marking engine 14, a storage buffer indicated generally at 18 and a finisher indicated generally at 20 in broken outline. The system includes appropriate fusers 22, 24 respectively for the monochromatic and multicolorant marking engines and transporter sections 26, 28, 30 for the monochromatic marking engine 16 and transporters 32, 34, 36 for the multicolorant marking engine 14. The storage buffer 18 includes a plurality of media path transport sections comprising the usual means of transporting cut sheets such as but not limited to belts 38, baffles and pairs of nip rollers 40. In the present practice, the buffer transport sections are configured and the nips spaced to accommodate about three sheets of letter sized cut sheet stock after marking in the engine 14. After marking, the sheets from the storage buffer 18 are sequentially merged with marked sheets from the monochromatic marking engine 16 onto transporter 42 for advancement to the finisher 20. The equipment arrangement of FIG. 1 thus permits the color image sheets to be batch printed concurrently with the higher speed printing in the monochromatic engine 16 without interrupting the production rate of the monochromatic marking engine or incurring repeated start up and shut down cycles of the multicolorant IME. The marked color image sheets from the multicolorant marking engine 14 are held in the storage buffer 18 and sequenced appropriately therefrom as required in the properly collated print job Referring to FIG. 2, another version of the digital image printing equipment arrangement is indicated generally at 50 and includes a multicolorant marking engine indicated generally at 52 with a fuser 54 which is disposed vertically above a monochromatic marking engine indicated generally at 56 which has its own fuser 58. Both marking engines 52, 56 receive sheet stock from a feeder indicated generally at 60 disposed adjacent the marking engine 56 and vertically below the marking engine 52. Appropriate transporters 62, 64 are provided for feeding sheet stock to the marking engines 52, 56. Additional transporters 66, 68, 70 provide for moving the marked sheets to the finisher indicated generally at 72 in broken outline adjacent fuser 58 and an associated transporter 70.

A storage buffer indicated generally at 74 is disposed vertically above the monochromatic marking engine 56 and adjacent the multicolorant marking engine 52 and is comprised of a series of addable vertically stacked modules 76. The storage buffer 74 is operative to receive marked sheets form multicolorant marking engine 52 and retain them until required for appropriate sequencing and entry onto the transporter 70.

Figure 3:
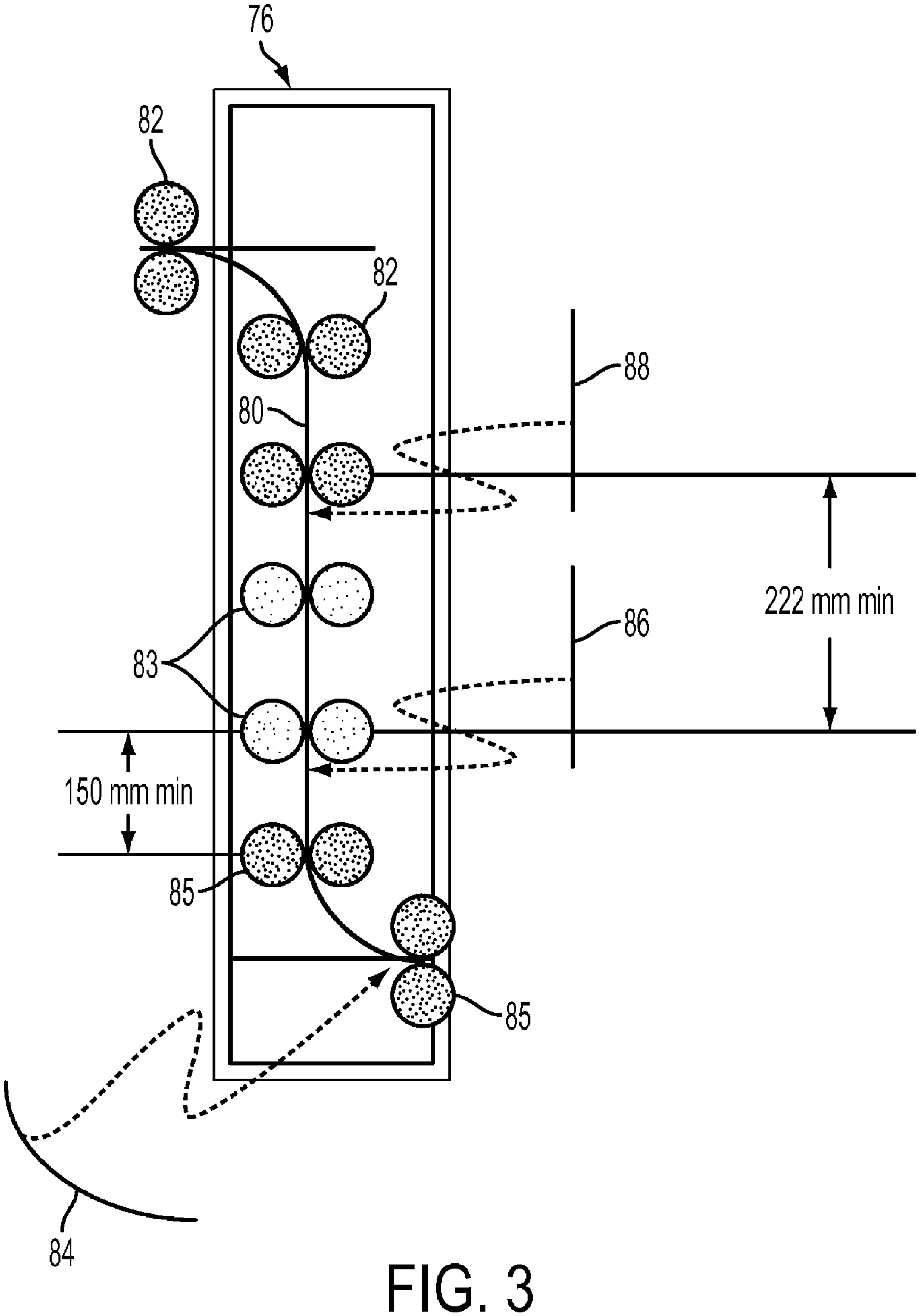
FIG. 3 is an enlarged detail of one of the storage buffer sections of the arrangement of FIG. 2.

Referring to FIG. 3, one of the buffer modules 76 is shown as having a sheet storage path 80 guided by any of belts, baffles and spaced sets of nips 82. In the present practice, the sheet storage path 80 accommodates about 3 cut sheets of letter size denoted by reference numerals 84, 86, 88 with the leading edges of the adjacent sheets disposed a distance in the range of about 222 to 230 millimeters for A-4/letter sized sheets fed long edge first [210 to 216 mm]. In the present practice, it has been found satisfactory to space the adjacent sets of nips a distance in the range of about 150 millimeters for A-4/letter sized sheets fed long edge first.

Figure 4:
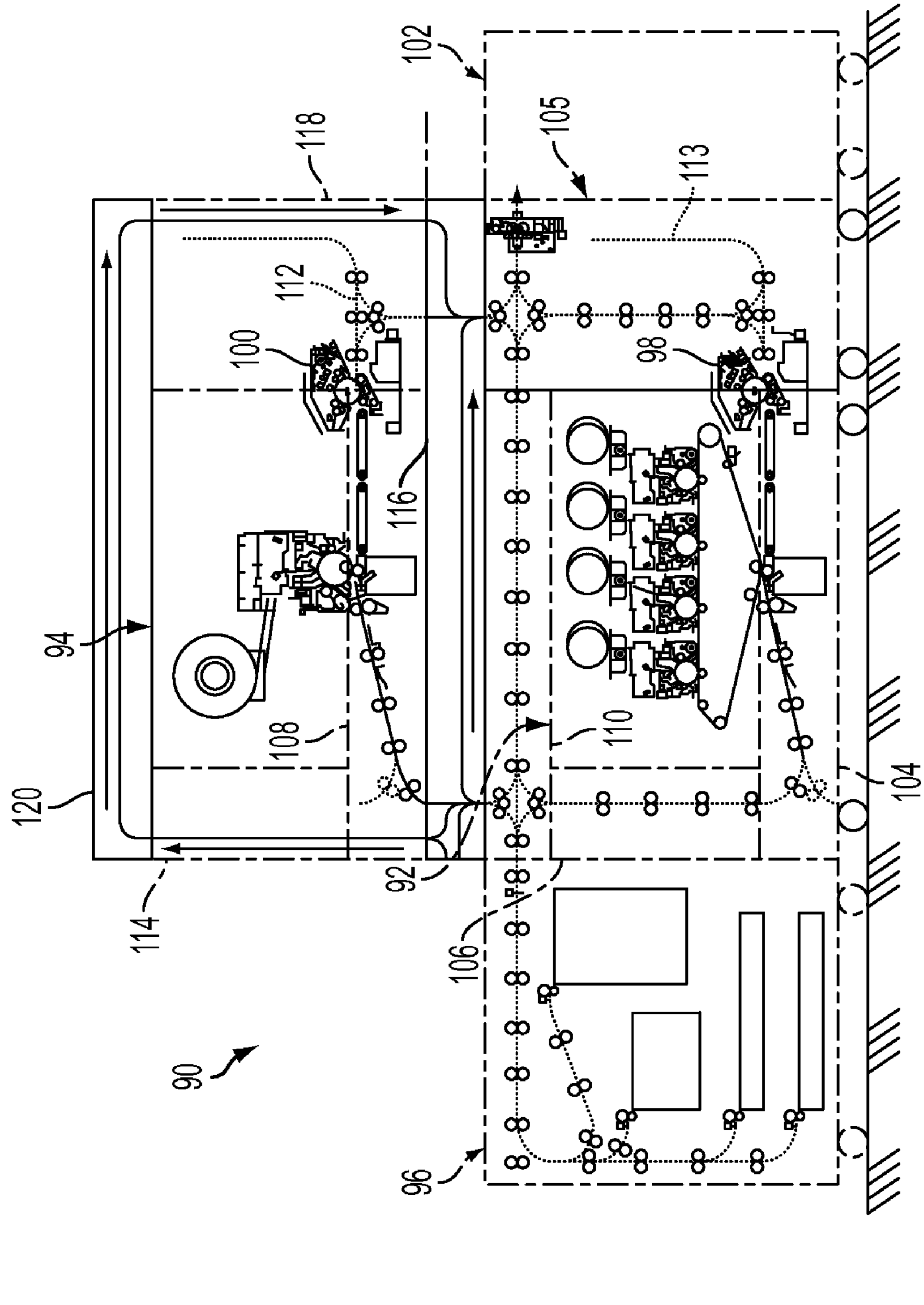
FIG. 4 is another version of a digital image printing equipment arrangement having a monochromatic marking engine disposed directly above a multicolorant marking engine and with the storage buffer disposed in multiple sections about the monochromatic marking engine.

Referring to FIG. 4, another version of the arrangement of the digital printing equipment for printing concurrently colored images and monochromatic images is indicated generally at 90 and includes a multicolorant marking engine indicated generally at 92 and a monochromatic marking engine indicated generally at 94 disposed vertically above the engine 92. A sheet stock feeder indicated generally at 96 is disposed adjacent the multicolorant marking engine 92. The marking engines 92, 94 include respectively fuser elements 98, 100; and, a finisher 102 is disposed adjacent the printer media exit module indicated generally at 105. The marking engines include appropriate transporter sections 104, 106, 108, 110, 112 and 113 which are operative to move the sheet stock through the marking engines and to the finisher 102.

The system 90 of FIG. 4 includes a storage buffer comprised of four sections 114, 116, 118, 120, each of which is disposed about a side of a monochromatic marking engine 94 and which is operative in the present practice to store about three marked letter size sheets for A-4/letter sized sheets fed long edge first from the multicolorant marking engine 92. Transporter 112 is operative to move sheets from the buffer to the transporter 114 to intersperse the color image sheets in proper sequence with the sheets from the monochromatic marking engine 92 and for subsequent movement to the finisher 102. The system 90 of FIG. 4 thus provides adequate storage for approximately 13 A-4/letter size sheets with minimal increase in the bulk or volume of the equipment and no additional increase in the required floor space.

Figure 5:
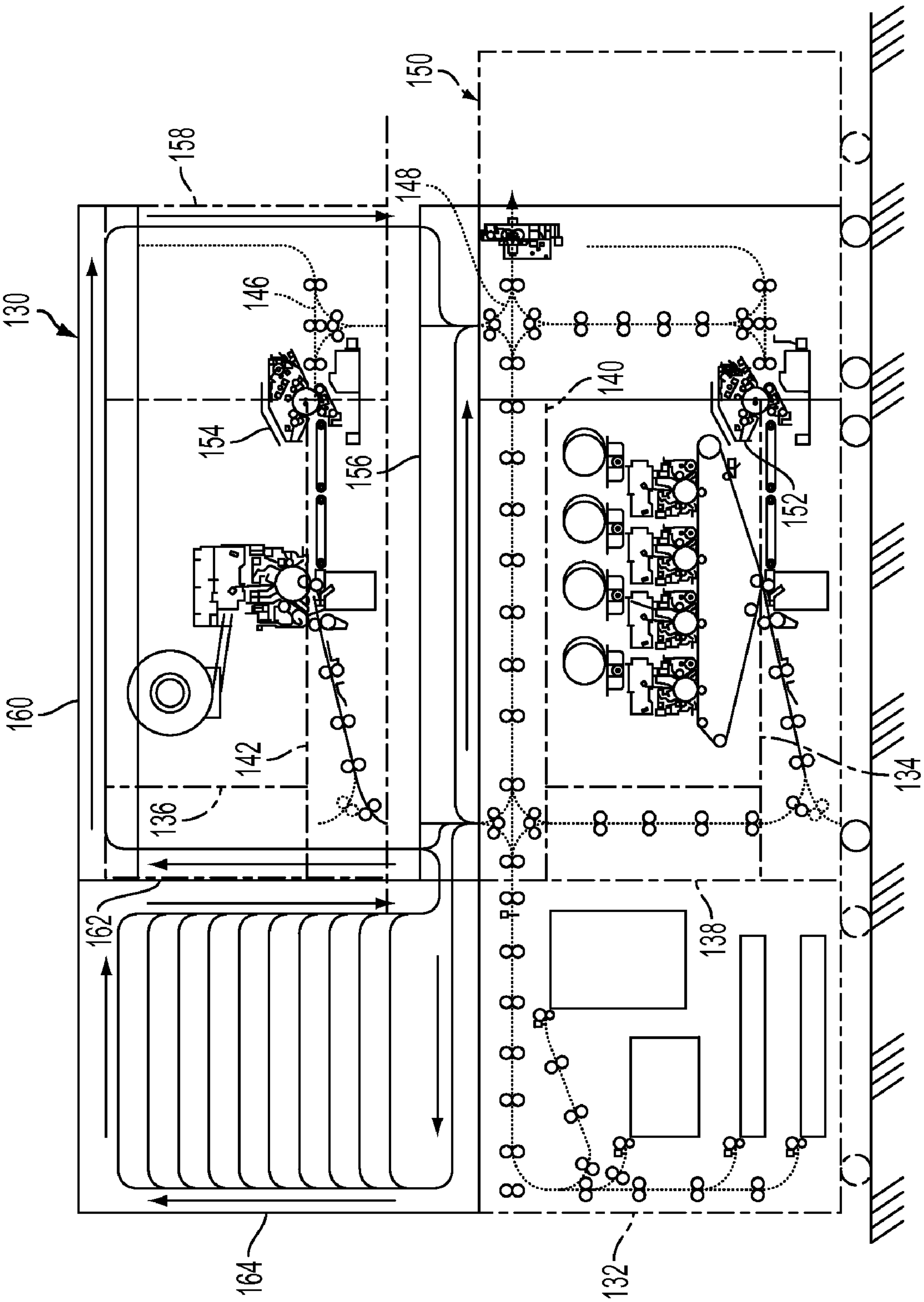
FIG. 5 is a view similar to FIG. 4 of another version of a digital image printing equipment arrangement having a monochromatic marking engine disposed above a multicolorant marking engine with storage buffer sections disposed about the monochromatic marking engine and an additional storage buffer adjacent the monochromatic marking engine.

Referring to FIG. 5, another version of the digital image printing equipment is indicated generally at 130 and includes a sheet stock feeder indicated generally at 132, a multicolorant marking engine indicated generally at 134 and a monochromatic marking engine indicated generally at 136 disposed vertically above the multicolorant marking engine 134. The system 130 includes appropriate transporter sections 138, 140, 142, 146 and 148 for moving the sheet stock into and out of the marking engines to a finisher indicated generally at 150 in broken outline disposed adjacent the transporter 148. Each of the marking engines 134, 136 includes respectively a fuser unit 152, 154.

The equipment arrangement in the version 130 in FIG. 5 includes a storage buffer comprising four sections denoted 156, 158, 160, 162; and, in the present practice each is positioned about one side of the monochromatic marking engine 136 as shown in FIG. 5. In the present practice, each of the buffer sections 156, 158, 160, 162 is operative to store three marked sheets from the multicolorant marking engine 134.

In the version 130 of FIG. 5, an additional optional full size sheet buffer 164 has been added to the structure adjacent the buffer section 162 and disposed directly vertically above the feeder 132, and provides printed sheet buffer storage capacity if required beyond the 13 sheet capacity of the four section buffer. The buffers are operatively connected to the transporters such that marked color image sheets are moved into transporter 148 for interspersing in the desired sequence with monochromatic marked sheets from the marking engine 136 and for transport to the finisher 150.

Figure 6:
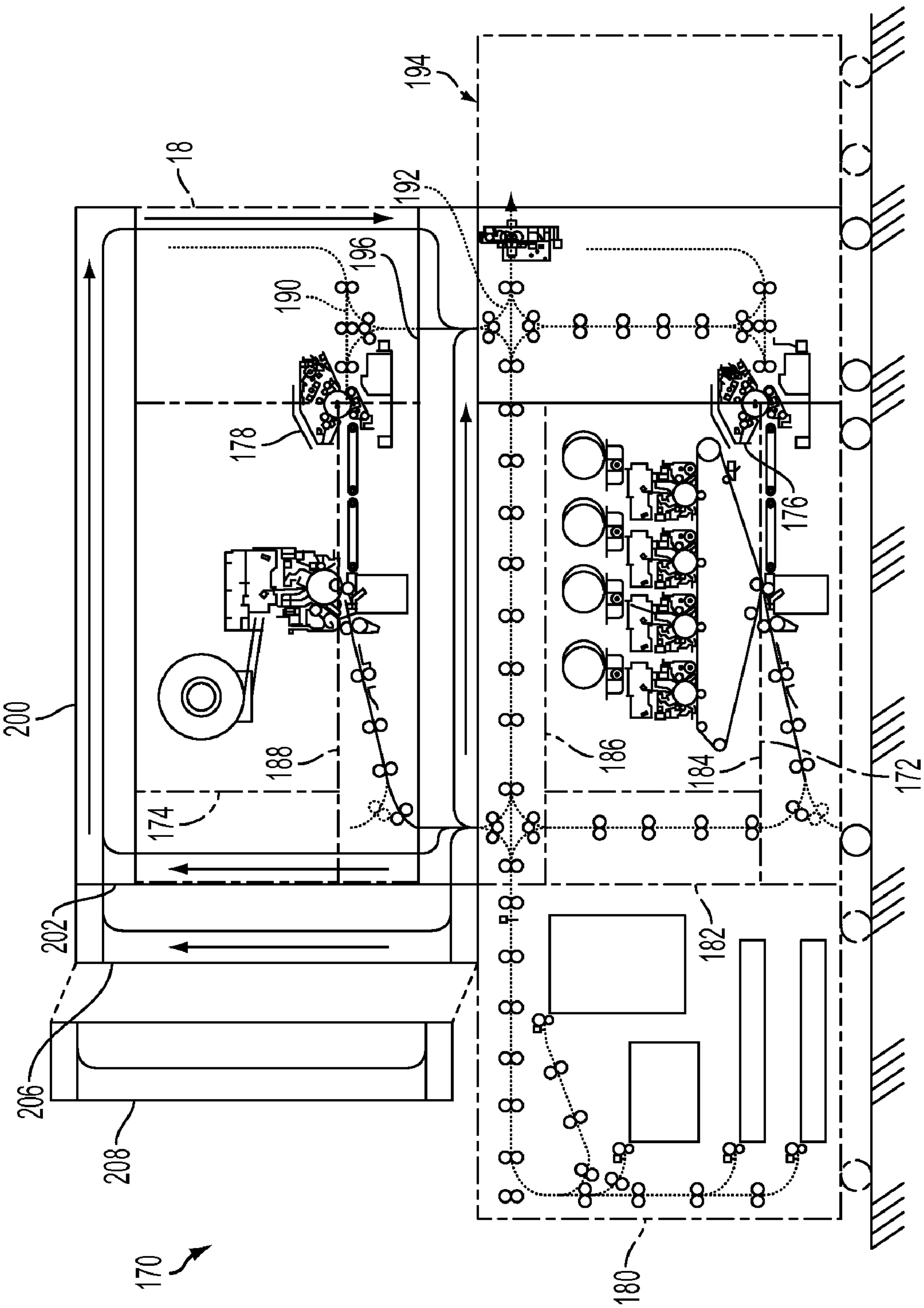
FIG. 6 is a view similar to FIG. 5 of another version of a digital image printing equipment arrangement for multicolorant and monochromatic marking of sheet stock. In this figure, the additional storage buffer comprises a multiplicity of addable sheet storage modules.

Referring to FIG. 6, another version of the digital image printing equipment for concurrent multicolorant and monochromatic marking is indicated generally at 170 and includes a multicolorant marking engine indicated generally at 172 with a monochromatic marking engine indicated generally at 174 disposed vertically directly thereabove, each of the marking engines 172, 174 includes respectively a fuser 176, 178.

A sheet stock feeder indicated generally at 180 is disposed adjacent the multicolorant marking engine 172; and, appropriate transporters 182, 184, 186, 188, 190, 192 are provided for moving the sheets into and from the marking engines to a finisher indicated generally at 194 in broken outline disposed adjacent the multicolorant marking engine and transporter 192.

A storage buffer comprising four sections 196, 198, 200, 202 are each disposed respectively about one side of the monochromatic marking engine 174 and transporter 190 and are operative to receive marked color image sheets from the marking engine 172 and to move the marked sheets from the storage buffer sections to the transporter 192 in the appropriate sequence for interspersing with sheets marked from the monochromatic marking engine 174 and subsequent movement to the finisher 194.

In addition, the version 170 may include optional addable sheet storage buffer sections such as denoted by reference numerals 206, 208 which may be attached to the buffer section 202 on the side of the marking engine 174. The arrangement of FIG. 6 thus permits increasing the storage buffer capacity incrementally by additional modular sections such as 206, and multiples of 208.

The present disclosure thus provides digital image marking equipment which enables concurrent marking of color images and monochromatic images in separate marking engines. Storage buffers are provided to hold the marked color images for interspersing in the desired sequence with the marked sheets from the monochromatic marking engine to thus provide a print job with both color and monochromatic images without reducing the production rate of the faster monochromatic marking engine.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of digital printing a job including both monochromatic and color images comprising:

(a) providing a monochromatic and a multicolorant marking engine;

(b) feeding sheet print media to the monochromatic marking engine and marking the monochromatic images thereon;

(c) concurrently feeding sheet print media to the multicolorant marking engine and marking the color images thereon;

(d) providing a storage buffer having a plurality of addable vertically oriented stacked modules disposed vertically above one of the marking engines and transporting the marked color image sheets to the storage buffer; and, (e) combining the marked sheets from the buffer and the other of the marked sheets in a predetermined sequence and transporting the sequenced sheets to a finisher for assembly.

2. The method defined in claim 1, wherein the step of providing a monochromatic and multicolorant marking engine includes disposing the monochromatic marking engine vertically above the multi-colorant marking engine and the step of feeding includes disposing a sheet feeder adjacent the multicolorant marking engine.

3. The method defined in claim 1, wherein the step of transporting includes disposing a buffer portion vertically above the monochromatic marking engine and a buffer portion on each of opposite sides of the mono-chromatic marking engine and interconnecting the buffer portions in series.

4. A system for digital printing of jobs including both monochromatic images and color images comprising:

(a) a monochromatic marking engine;

(b) a multicolorant marking engine;

(c) a sheet print media feeder operatively connected to feed sheets to the monochromatic and multicolorant marking engines;

(d) a sheet buffer having a plurality of addable vertically oriented stacked modules disposed vertically above one of the marking engines and operative to hold marked sheets from the multicolorant marking engine for a time interval;

(e) a transporter operative to move sheets from the multicolorant marking engine to the buffer, wherein the buffer is operative to combine sheets therefrom in a predetermined sequence with sheets from the other marking engine; and (f) a finisher operative to assemble the sequenced sheets.

5. The system defined in claim 4, wherein the monochromatic marking engine is disposed vertically above the multicolorant marking engine.

6. The system defined in claim 4, wherein the buffer is comprised of a plurality of any of belts, baffles and nip rollers, each operative to store in the range of about 3 sheets of print media.

7. The system defined in claim 4, wherein the buffer is comprised of a plurality of belts, each having a first, second and third cluster of nips.

8. The system defined in claim 7, wherein said second and third clusters are spaced about 150 mm.

9. The system defined in claim 7, wherein the distance from the terminus of the first cluster to the terminus of the second cluster is about 222 mm.

10. The system defined in claim 4, wherein the multicolorant marking engine is disposed vertically above the monochromatic marking engine.

* * * * *